US012635828B2

(12) United States Patent
    Hohimer et al.

(10) Patent No.: US 12,635,828 B2
(45) Date of Patent: May 26, 2026

(54) MULTIPLE TANK WATER HEATER SYSTEM

(71) Applicant: BUNN-O-MATIC CORPORATION, Springfield, IL (US)

(72) Inventors: Matthew Hohimer, Springfield, IL (US); Scott Johansen, Springfield, IL (US); Joel Morton, Springfield, IL (US); Matthew P. Rutledge, Springfield, IL (US); Colin Weisenfeld, Springfield, IL (US)

(73) Assignee: BUNN COMMERCIAL LP, Springfield, IL (US)

( * ) Notice: Subject to any disclaimer, the term of this patent is extended or adjusted under 35 U.S.C. 154(b) by 953 days.

(21) Appl. No.: 17/794,542

(22) PCT Filed: Jan. 25, 2021

(86) PCT No.: PCT/US2021/014957
    § 371 (c)(1),
    (2) Date: Jul. 21, 2022

(87) PCT Pub. No.: WO2021/151093
    PCT Pub. Date: Jul. 29, 2021

(65) Prior Publication Data
    US 2023/0055225 A1     Feb. 23, 2023

Related U.S. Application Data

(60) Provisional application No. 62/964,951, filed on Jan. 23, 2020.

(51) Int. Cl.
    *A47J 31/56*      (2006.01)
    *A47J 31/24*      (2006.01)
    *A47J 31/54*      (2006.01)

(52) U.S. Cl.
    CPC ............... *A47J 31/56* (2013.01); *A47J 31/24* (2013.01); *A47J 31/54* (2013.01)

(58) Field of Classification Search
    CPC   A47J 31/54; A47J 31/56; A47J 31/057; A47J 31/24
    (Continued)

(56) References Cited

U.S. PATENT DOCUMENTS

| | | | |
|---|---|---|---|
| 3,552,298 A | 1/1971 | Bufkin | |
| 5,111,969 A | 5/1992 | Knepler | |

(Continued)

FOREIGN PATENT DOCUMENTS

| | | | | | |
|---|---|---|---|---|---|
| CN | 106510460 A | * | 3/2017 | ............ | A47J 31/605 |
| CN | 108577540 A | * | 9/2018 | ............ | A47J 31/605 |

(Continued)

OTHER PUBLICATIONS

Search Report & Written Opinion issued in Appl. No. PCT/US2021/014957 (Apr. 14, 2021).

*Primary Examiner* — Reginald Alexander
(74) *Attorney, Agent, or Firm* — Barnes & Thornburg LLP

(57)     ABSTRACT

A multiple tank heated water system and method for use with a beverage making apparatus. The system includes at least two individual water tanks for controllable heating water. A first tank of the multiple tanks including an inlet port receiving water from a water source for controllably heating water. A second tank communicating with the first tank to receive heated water from the first tank for controllably heating in the second tank. A control system operatively associated with the heated water system. A thermostat connected to each of the multiple tanks for detecting the temperature of the water within the tank, each thermostat communicating with the control system. A heating element (Continued)

associated with each tank, each heating element communicating with the control system.

14 Claims, 8 Drawing Sheets

(58) Field of Classification Search
USPC ..................................................... 99/300, 305
See application file for complete search history.

(56) References Cited

U.S. PATENT DOCUMENTS

| | | | |
|---|---|---|---|
| 5,724,883 | A | 3/1998 | Usherovich |
| 5,858,437 | A * | 1/1999 | Anson ................... A47J 31/402 |
| | | | 99/305 |
| 6,374,725 | B1 | 4/2002 | Leung |
| 8,225,961 | B2 | 7/2012 | Anson |
| 9,113,748 | B2 * | 8/2015 | Van De Leijgraaf ........................ |
| | | | A47J 31/0573 |
| 2003/0066430 | A1 | 4/2003 | Bitar et al. |
| 2005/0115413 | A1 | 6/2005 | Kim et al. |
| 2005/0268790 | A1 | 12/2005 | Baldacci |

FOREIGN PATENT DOCUMENTS

| | | | | |
|---|---|---|---|---|
| CN | 109349926 | A * | 2/2019 | ........... A47J 31/404 |
| DE | 19909183 | | 9/2000 | |
| EP | 1530939 | | 8/2007 | |

* cited by examiner

MULTIPLE TANK WATER HEATER SYSTEM

CROSS REFERENCE TO RELATED APPLICATIONS

This application is a U.S. nationalization under 35 U.S.C. § 371 of International Application No. PCT/US2021/014957, filed Jan. 25, 2021, which claims the benefit of priority under 35 U.S.C. § 119(e) to U.S. Provisional Patent 62/964,951, filed Jan. 23, 2020. The disclosures set forth in the referenced applications are incorporated herein by reference in their entirety.

BACKGROUND

The present disclosure includes information relating to improvement in beverage making apparatus and/or systems relating to the control and management of water used in the beverage dispensing system. In particular, the present disclosure relates to a heated water beverage system in which heated water is used and combined with beverage making ingredients. As noted below, the beverage making ingredients could be a range of ingredients including powder, ground coffee, tea, and/or other ingredients. The objective of such a brewer is to bring together the beverage making ingredients with the heated water to produce a beverage. The heated water is used to infuse ingredients or to mix with the ingredients to dissolve or otherwise integrate the ingredients in the liquid. The result of such a beverage making machine is to produce a heated beverage. The heated beverage can be cooled prior to or at the time of dispensing through heat transfer mechanisms or by the addition of ice or other unheated or chilled ingredients.

Prior art beverage making systems typically use a single heated tank in which water is introduced from the bottom of the tank. Water is introduced into the tank and contacts a heating element or is otherwise heated and retained in the tank for dispensing during a beverage brewing or beverage making cycle. One of the problems with prior art beverage making systems is that a single tank must be continuously refilled in order to supply back-to-back brews or dispensing of beverages. This requires generally continuous energization of the heating element to provide energy to elevate the temperature of the water in the tank. While this may be acceptable for some brewing situations, continuous or large burst brewing may require more heated water than can be produced within the refill cycle.

As an example, while a coffeemaker such as a coffee brewer can produce a pot, approximately half a gallon, of coffee using the water in the tank, it may have difficulty in producing a second pot of coffee at the desired brewed temperature over numerous brewing cycles. This is because there is a requirement to add heat energy to the water with an electrical heating element. While additional heat can be added to the system with a higher wattage heating element there can be a limit on how much energy can be added to the water based on the electrical system supplying energy to the brewer. As such, there is a maximum level of heat energy that can be added using a single heating element in a single tank.

Some prior art solutions have been to increase the volume of the tank. However, this can be inefficient since it requires continuously heating such a tank to maintain a desired temperature to be ready to produce coffee on demand Such a large volume tank can also require a significant investment of energy when starting up the system if it has been shut down over a vacation, long weekend or other intermittent off cycle.

In addition, when refilling a prior art tank, incoming typically water mixes with the entire contents of the volume. This mixing is due to the positon of the inlet disturbing the natural stratification of the water in the tank. This mixing can cause delay the brewing until the full volume is raised to the required temperature for brewing.

This background information is provided for some information believed by the applicant to be of possible relevance to the present disclosure. No admission is intended, nor should such admission be inferred or construed, that any of the preceding information constitutes prior art against the present disclosure. Other aims, objects, advantages and features of the disclosure will become more apparent upon reading of the following non-restrictive description of specific embodiments thereof, given by way of example only with reference to the accompanying drawings.

BRIEF DESCRIPTION OF THE DRAWINGS

The present disclosure will be described hereafter with reference to the attached drawings which are given as a non-limiting example only, in which:

FIG. 4 shows the multiple tanks which have been connected in a daisy-chain configuration in which the output of the first tank is fed to the input of the second tank, the output of the second tank is input into the third tank and the output of the third tank is input into the fourth tank, with each tank collectively providing additional heat energy to a quantity of water retained within and/or flowing through the tank for progressively heating and maintaining a collective volume of water in a heated condition;

FIG. 7 shows a front illustration with the tangential input on the right side of the tank, FIG. 8 shows a right side view of FIG. 7, FIG. 9 shows a cross section taken along line 9-9 in FIG. 8 showing the location of a heating element extending into the tank in a coiled configuration to provide heat energy through electrical inputs to water retained in the tank, and FIG. 10 shows a bottom plan view of the illustration in FIG. 8.

Figures 1, 2:
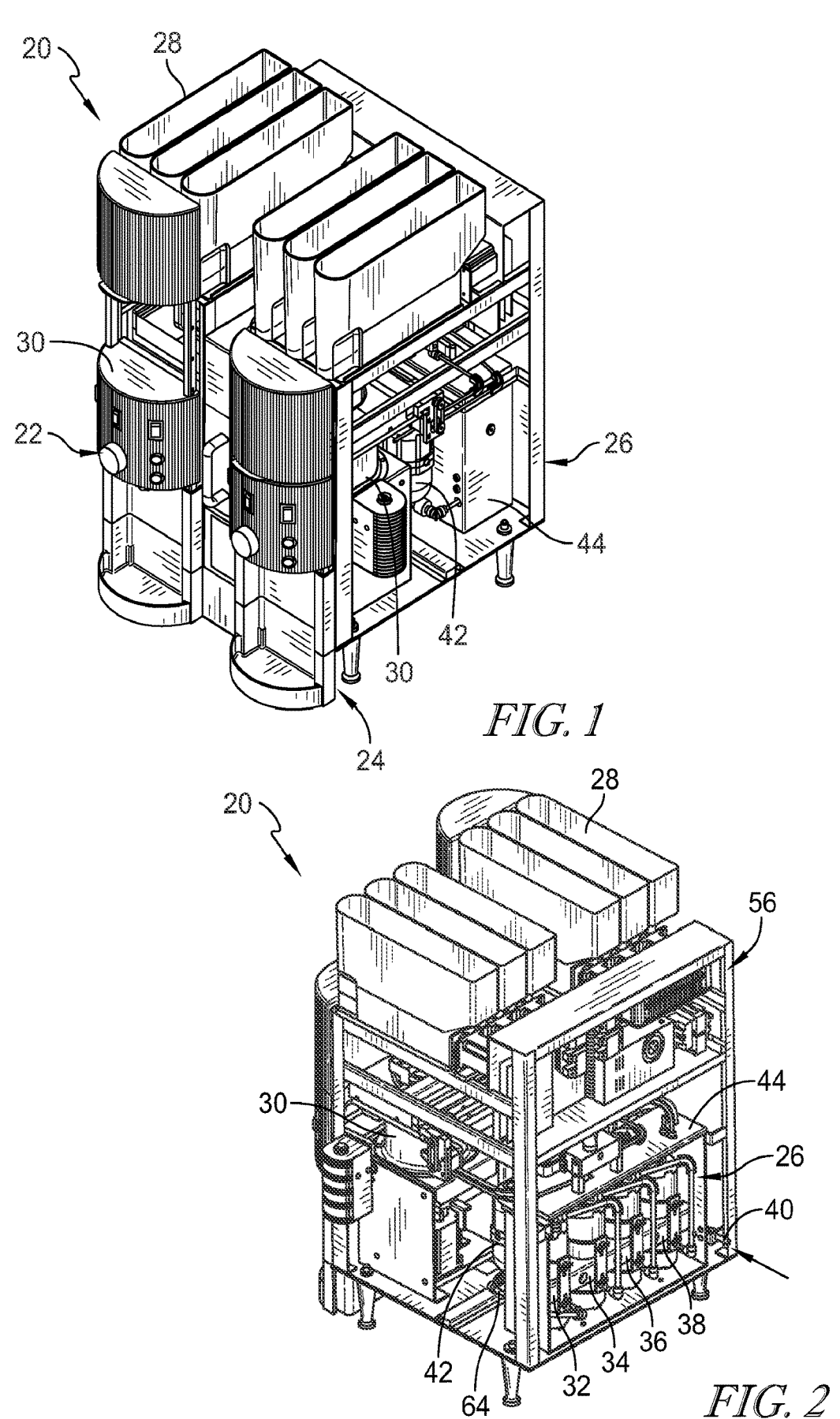
FIG. 1 is a front perspective view of a partially revealed beverage making apparatus and/or system that includes front positions for receiving beverage produced within the system and a heated water system positioned at a rear portion of the system, housing panels of the apparatus have been removed to reveal the internal components and operations of this system for convenience in discussing this apparatus.
FIG. 2 is the same beverage dispensing system as in FIG. 1 showing the rear position in which the heated water system is revealed showing multiple tanks which have been connected to one another as will be described in greater detail below.

The exemplification set out herein illustrates embodiments of the disclosure that are not to be construed as limiting the scope of the disclosure in any manner. Additional features of the present disclosure will become apparent to those skilled in the art upon consideration of the following detailed description of illustrative embodiments exemplifying the best mode of carrying out the disclosure as presently perceived.

DETAILED DESCRIPTION

While the present disclosure may be susceptible to embodiment in different forms, there is shown in the drawings, and herein will be described in detail, embodiments with the understanding that the present description is to be considered an exemplification of the principles of the disclosure. The disclosure is not limited in its application to the details of structure, function, construction, or the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of various phrases and terms is meant to encompass the items or functions identified and equivalents thereof as well as additional items or functions. Unless limited otherwise, various phrases, terms, and variations thereof herein are used broadly and encompass all variations of such phrases and terms. Furthermore, and as described in subsequent paragraphs, the specific configurations illustrated in the drawings are intended to exemplify embodiments of the disclosure. However, other alternative structures, functions, and configurations are possible which are considered to be within the teachings of the present disclosure. Furthermore, unless otherwise indicated, the term "or" is to be considered inclusive.

Terms including beverage, brewed, brewing, brewing substance, brewed liquid, and brewed beverage as may be used herein are intended to be broadly defined as including, but not limited to, the brewing of coffee, tea and any other beverages. This broad interpretation is also intended to include, but is not limited to any process of dispensing, infusing, steeping, reconstituting, diluting, dissolving, saturating or passing a liquid through or otherwise mixing or combining a beverage substance with a liquid such as water without limitation to the temperature of such liquid unless specified. This broad interpretation is also intended to including, but is not limited to beverage substances such as ground coffee, tea, liquid beverage concentrate, powdered beverage concentrate, flaked, granular, freeze dried or other forms of materials including liquid, gel, crystal or other forms of beverage or food materials to obtain a desired beverage or other food product.

Beverage ingredients will be described in the present application and will be generally referred to as "coffee". However, it should be understood that the term beverage ingredient should be broadly interpreted regardless of reference to beverage ingredient or coffee. Also, the characteristics or form of the beverage ingredient can be any variety of ingredients which are currently known or hereafter developed. The form of the beverage ingredient may include powder, liquid, gel, crystal, flake, freeze-dried and any other form or state regardless of temperature, phase or other characteristics. Reference to beverage dispensing includes reconstituting, brewing, steeping or any other form of combining a dilution ingredient with a beverage ingredient.

Moreover, while "beverage" is referred to, it is envisioned that any variety of food ingredients could be placed in an ingredient container to reconstitute a desired food. In this regard, the food could take the form of juice, coffee, tea, other flavored beverages, as well as other foods. Furthermore, use of a dilution ingredient is to be broadly interpreted. While "water" is referred to for convenience throughout the application it should be understood that any variety of dilution ingredients could be used with the present application.

The foregoing terms as well as other terms should be broadly interpreted throughout this application to include all known as well as all hereafter discovered versions, equivalents, variations and other forms of the abovementioned terms as well as other terms. The present disclosure is intended to be broadly interpreted and not limited.

FIG. 1 shows a beverage dispensing apparatus 20 having beverage dispensing locations 22, 24 on an area defined as the "front" of the apparatus. A heated water dispensing system 26 is located generally opposite of these dispensing points at what is referred to for convenience of this description as a "rear" location of the apparatus. Housing portions of the apparatus have been removed to reveal the heated water system 26. Typically, housing or body panels would enclose the structures and components during the normal use and operation of such an apparatus 20.

The heated water system 26 provides heated water which is used during beverage making or brewing cycles. In the apparatus as shown, a series of hoppers 28 are provided to retain beverage making substance. The beverage making substance can be in the form of ground coffee, tea, powered beverage substances and similar items. These items can be controllably dispensed individually or in combinations depending on the type and operation of the beverage making apparatus 20. For purposes of this disclosure we will assume that this is a coffee brewing system even though this narrow interpretation should not control the interpretation of this disclosure nor claims which might issue on this disclosure. In the normal operations of such a beverage brewing machine ground coffee is controllably dispensed into a brew chamber 30 retained within the apparatus. Heated water from the heated water system is controllably provided to the brew chamber 30 to create a beverage which is dispensed at the dispensing location 22.

Turning now to FIG. 2, the rear portion of the apparatus is showing a series of tanks 32, 34, 36, 38 as will be described in greater detail below. An inlet line 40 is provided to introduce water from a pressurized source to the apparatus 20. The heated water system 26 receives this water and controllably introduces it to the heated water system for controlled heating and dispensing for use in a beverage making or brewing cycle. One of the objectives of this invention is to provide a relatively steady flow of generally consistent temperature heated water for multiple back-to-back brewing cycles with little if any decline in the temperature of the water used in the brewing cycle. An accumulator 42 is shown on the interior of the apparatus behind a frame 44. The accumulator may be used to retain a quantity of expansion water when the system heats water. The accumulator may be omitted if the system can accommodate the expansion water within the system. The accumulator may be omitted if the expansion water can flow to a drain form the system, as well.

Figure 3:
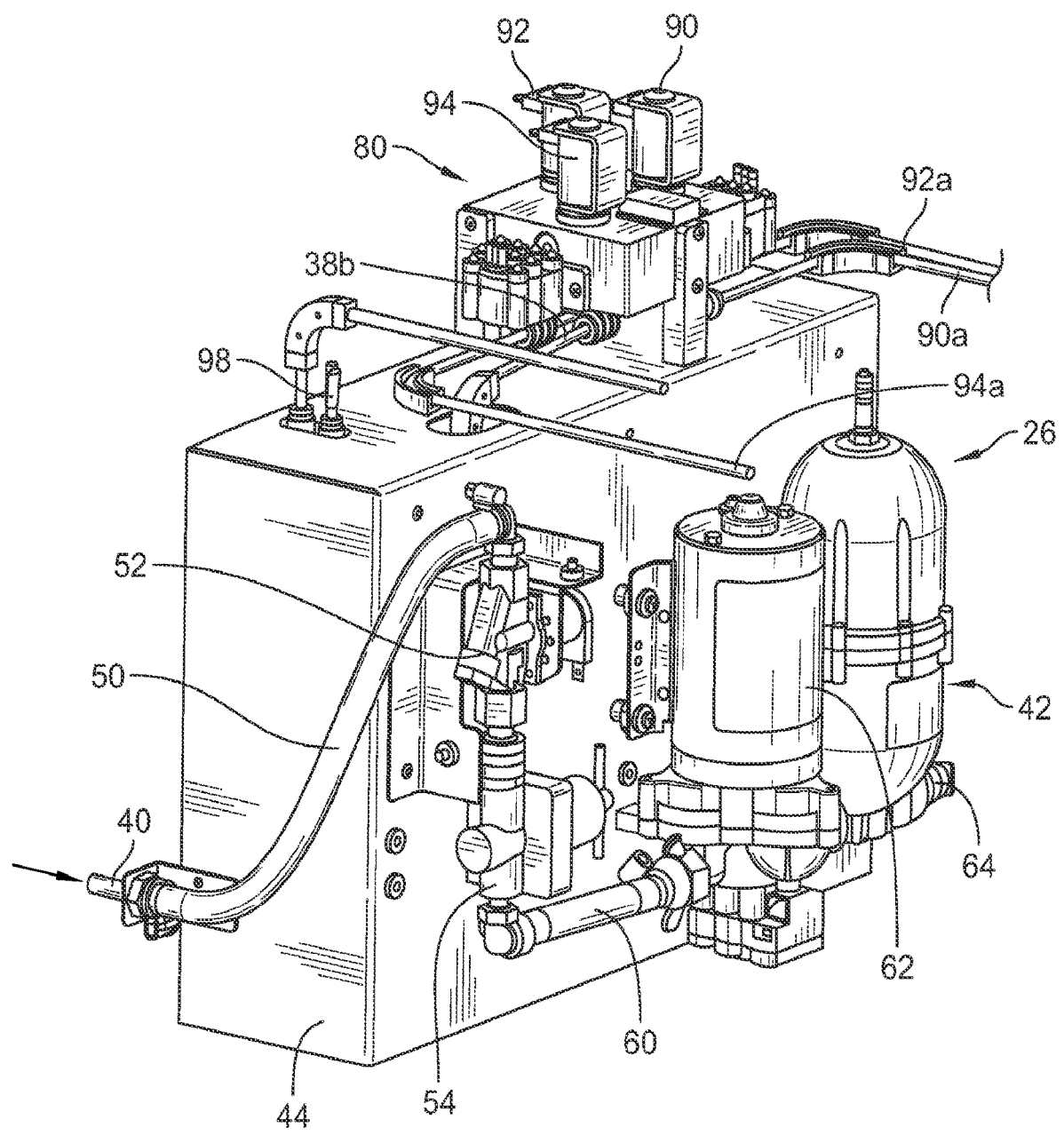
FIG. 3 is an enlarged view of the heated water dispensing system from a position inside of the apparatus shown in FIGS. 1 and 2 illustrating a diaphragm pump, and a water regulator connected to the heated water system on the inlet side of the water dispensing system to provide control of the inlet source of water to the multiple tanks of the heated water system.

FIG. 3 shows an enlarged view of the heated water system 26 which has been removed from the apparatus 20 and enlarged to show the interior portion and the opposite side of the frame 44 to which the accumulator 42 is attached. This view shows the inlet line 40 which is connected through inlet tube 50 to a controllable inlet valve 52. Output of the controllable inlet valve is connected to a water regulator 54. The inlet valve 52 and other components are controlled by a control system 56 retained within the apparatus 20. Each of the controllable or sensing devices is connected to the control system 56 for programmed or otherwise controlled operation of each of the devices or receipt of information from the sensors in a controlled manner Programming is provided in the control system 56 to operate all of the mechanisms and systems within the apparatus in a preferred manner.

The output water from the regulator 54 feedline 60 and is connected to a diaphragm pump 62. The diaphragm pump provides controlled pumping of water through the system at a predetermined flow rate via a flow regulator 55, for example, three gallons per minute. Flow rates of a higher level or a lower level can be designed for use with a system and any number such as the flow rate as noted above is by way of convenience in describing these systems. The output from the diaphragm pump 62 travels through the system input line 64. The accumulator 42 is attached to the system input line to allow for expansion water to flow without stressing the system or being forced out through the dispense lines. The accumulator allows intermittent accumulation and depletion of a volume of water. As noted above, the accumulator may be omitted if the system can accommodate the expansion water within the system. The accumulator may be omitted if the expansion water can flow to a drain from the system, as well, see FIG. 13 brew water drain valve 200 and drain 202.

The accumulator 42 is used to manage expansion water from the series of hot water tanks. When the system is deactivated or paused between brew cycles the tanks will continue to heat until they achieve the desired preset temperature. When the tanks are paused they tend to "catch up" and reach the desired temperature. However, under these conditions, where the tanks are not pressurized by operation of the pump 62, the heating of the water tends to expand the water, as well. As a result, the accumulator 42 prevents the need for a drain line which would otherwise be needed to accommodate the expanding heated water. The use of the accumulator 42 eliminates the need for the drain line and also eliminates the expansion of water exiting through the spray head or dispense line. The accumulator includes an internal pressurized bladder which accommodates some degree of expansion in the tank which is designed to prevent flow out through the spray head or the requirement of a drain line. When the dispense cycle is activated and water is flowing through the system again the pressure on the bladder is sufficient to return water to the inlet line 64 and be incorporated in the flow of water feeding the tanks during the next brew cycle.

Figure 4:
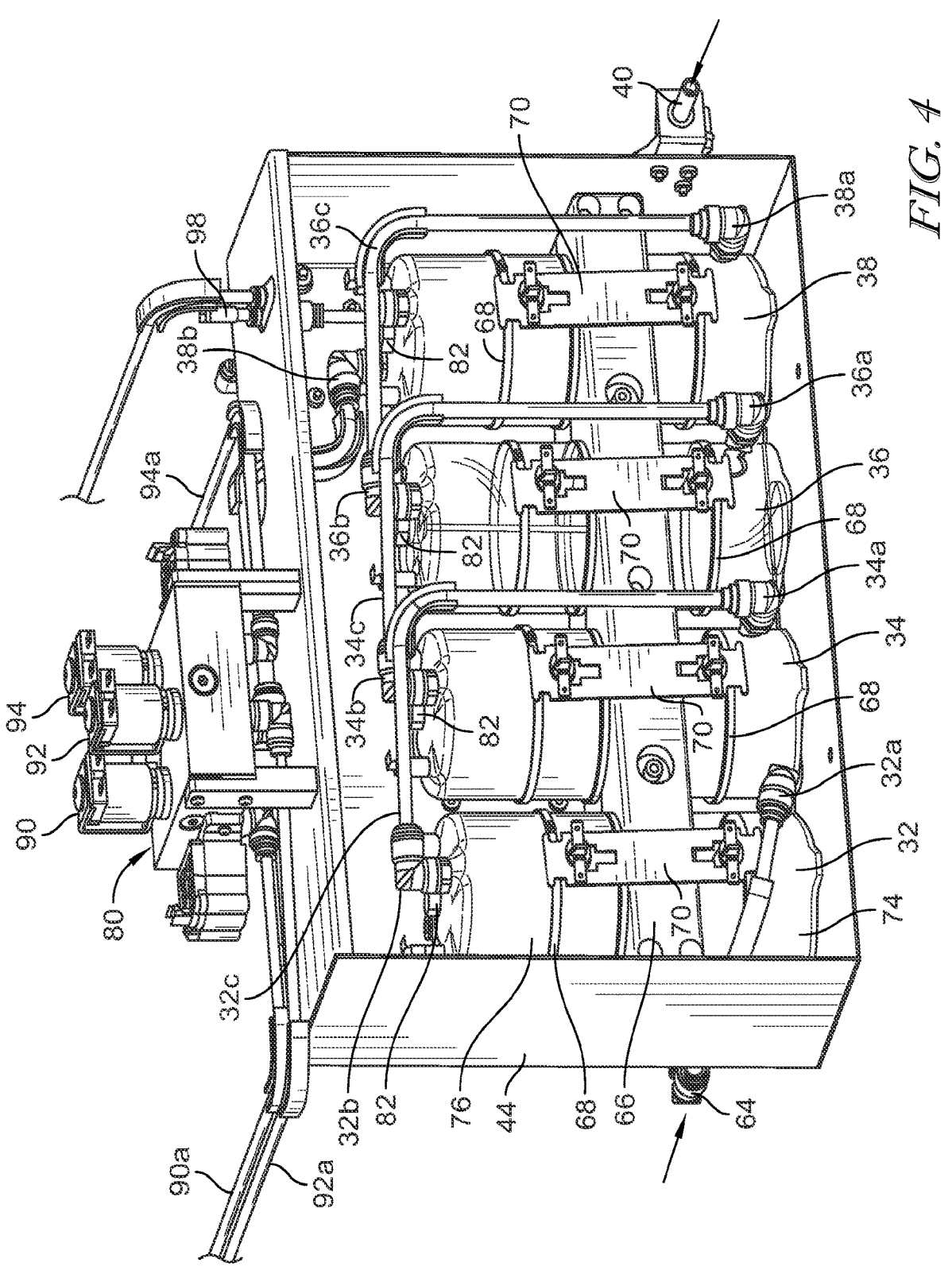
FIG. 4 is an enlarged view of the heated water system as shown in FIG. 3 in which it has been rotated consistent with the illustration in FIG. 2.

As shown in FIG. 4, the system input line 64 passes through the frame 44 to provide initial feed water into the series of tanks that are retained within the frame. A tank mount 66 is attached to the frame and bands 68 are attached to brackets 70, with each bracket 70 attached to the mount 66. The bands extend from the bracket around each tank to retain the tank in a secure position within the frame 44.

Water flowing through the system inlet line is first introduced into the first tank 32 at a lower portion 74 of the tank. Each tank has a generally cylindrical configuration oriented along a vertical axis having the lower portion 74 and an upper portion 76. An input 32a is connected to the lower portion 74 of tank 32. As will be described in greater detail below, water is heated by means of a heating coil or heating element retained within the tank. Heated water is transported by being displaced by water being introduced into the tank 32 under the controlled pumping influence of the pump 62 from an output port 32b and travels through feedline 32c. Feedline 32c is connected at the input port 34a of tank 34. In similar manner to tank 32, the output port 34b of tank 34 is connected to a feedline 34c. This feedline 34c connects to the input port 36a of tank 36. The output port 36b of tank 36 connects to a feedline 36c which connects to the input port 38a of tank 38. The output port 38b is connected to a water distribution manifold 80.

As can be seen from the foregoing description and illustrations in FIG. 4, the series of tanks 32, 34, 36, 38 are connected in a daisy-chain manner in which the output from one tank is connected to the input of the downstream tank. The multiple tanks are used to provide heat energy at each tank to increase the temperature of the water in the tank. Each of the tanks also includes a thermostat 82 which is connected to the control system 56 the thermostats can be monitored for activating of deactivating the heating element. If a high limit of the temperature is detected at a thermostat 82 the input signal from that thermostat can be used by the control system 56 to deactivate energy to the corresponding heating element in the corresponding tank. As well as providing safety by not overheating the tanks, this control system also helps manage the efficient utilization of energy in the system.

As shown in FIGS. 1 and 2, multiple dispensing stations are provided in the illustrated apparatus. While a single dispensing station could be used, more than two dispensing stations could also be employed in such an apparatus. In this regard, the water distribution manifold 80 is connected to the control system 56 to controllably operate solenoid valves 90, 92, 94 which are connected to corresponding heated water dispense lines 90a, 92a, 94a. In addition, a pressure relief safety valve 98 is provided on the last tank 38 of the series of tanks.

The multiple tanks provide for efficient back-to-back brewing of relatively large volumes of beverage by providing a constant heating system. As an example, the series of tanks can be configured with the first three tanks providing 3,000 watts of energy from each heating element connected to a 230 volt system. Once the series of tanks are filled, the heating elements can be activated to provide energy to the tanks. As soon as the tanks are a predetermined temperature the heating elements can be activated and deactivated to maintain the desired temperature. When a demand is placed on the heated water system 26 the pump 62 operates to drive water from the input line 64 through each of the subsequent tanks and lines to create an output pressure at the water distribution manifold 80. The control system 56 operates one or more of the solenoids 90, 92, 94 to dispense a desired quantity of water to a brew chamber or other dispensing system. As the water is flowing through the system the thermostats 82 detect a drop in water temperature and communicate this information to the control system 56. As a result, the control system 56 activates, to the degree necessary, the heating elements to provide energy to the water in the tanks.

As expected, the coolest water is introduced through the inlet line 64 to tank 32. Even if the demand on the system does not permit the water in tank 32 to reach the desired temperature, additional energy can be provided in tanks 34, 36 or even 38 to elevate the temperature. As such, each tank provides a relatively reliable and consistent temperature of water resulting in a relatively consistent output temperature at the manifold 80. In such a system, the last tank can even be at a lower wattage since it tends to generally "top off" the heat needed for a consistent dispensing temperature. The control and operation of this system helps maintain a generally consistent flow rate and temperature. In addition, the operation of several tanks in series can provide a more efficient footprint arrangement within the apparatus as compared to one large tank of equal volume. This provides more design options for the system.

Figure 5:
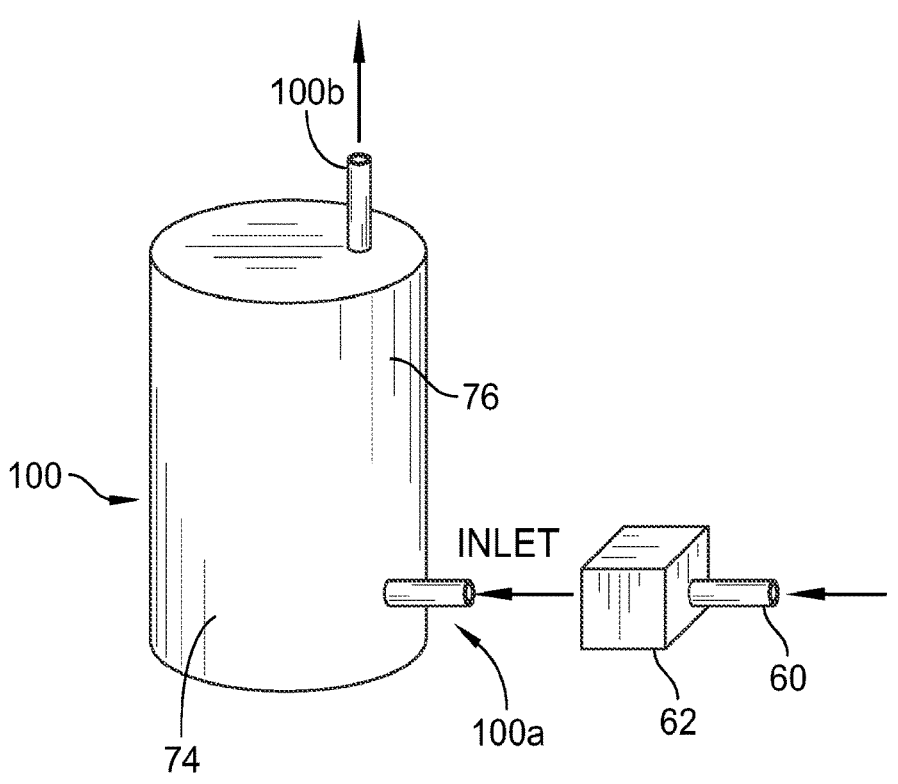
FIG. 5 is a generalized diagram illustrating the basic conditions associated with a tangential input tank in which water is introduced into a lower portion of the tank at a tangential input port and dispensed at an upper portion of the tank also at a tangential output port.
Figure 6:
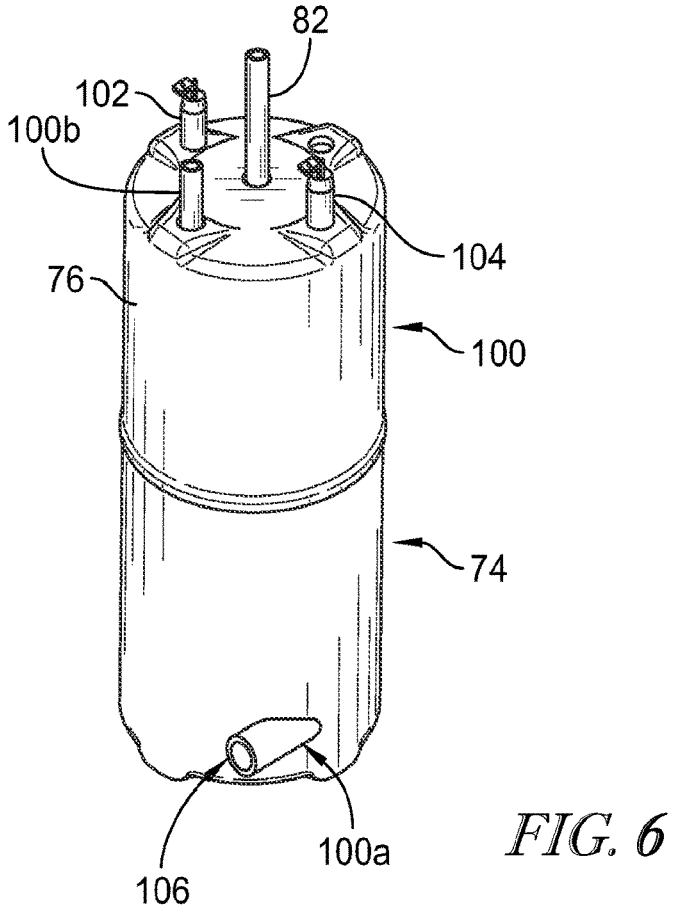
FIG. 6 is a solid model showing this tank design and illustrating the tangential input located at the lower portion of the tank, two electrical connections are positioned at the top of the tank and connect to two ends of a heating element retained within the tank as shown in subsequent Figures.

The present system also includes a tangential inlet tank 100. This tank 100 is representative of each of the series of tanks 32, 34, 36, 38 shown in FIGS. 2 and 3. The tangential tank 100 has a tangential inlet port 100a located in the lower portion 74 of the tank. The electrical connections 102, 104 of the heating element extend from the upper portion 76 of the tank 100. Water 106 is introduced through the tangential port 100a to improve the motion of water within the cavity of the tank as will be shown and described in FIGS. 7-10. In its simplest form as shown in FIG. 5, water is introduced by the pump 62 through the tangential port 100a in the lower portion 74 of the tank 100. Water swirls through the interior of the tank around the heating element retained therein. This provides some degree of stratification of the water within the tank. This allows the water to progressively swirl and move upwardly through the tank as water is dispensed through the outlet 100b positioned in the upper portion 76 of the tank 100. While the outlet 100b of the tank is shown as a direct outlet from the top portion of the tank, the tank could also be configured with a tangential outlet, additional configurations may be provided. As noted, a pressure relief valve 98 is provided at the upper portion 76 of the tank 100. The swirling action within the tank caused by the tangential introduction of water into the tank helps provide controlled stratified agitation of the water in a controlled, generally positive layering or stratification of the water within the tank.

Figures 7, 8, 9:
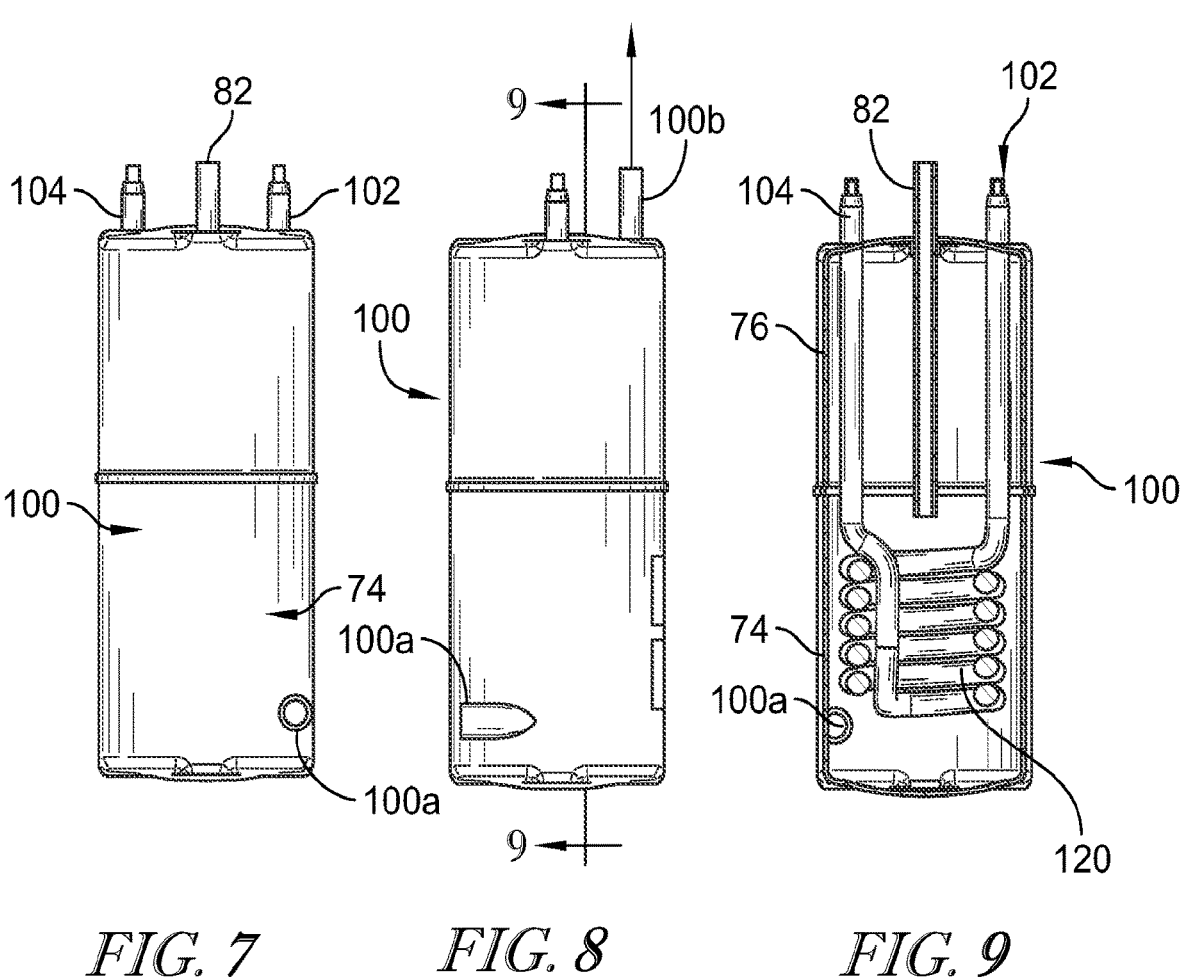
FIG. 7-FIG. 10 show various views of a tank similar to that as shown in FIG. 6 in which the location of the tangential input is provided in the lower portion of the tank.
Figure 10:
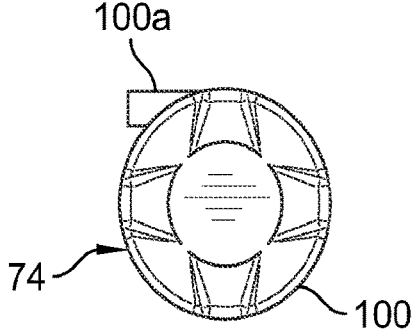
Figure 11:
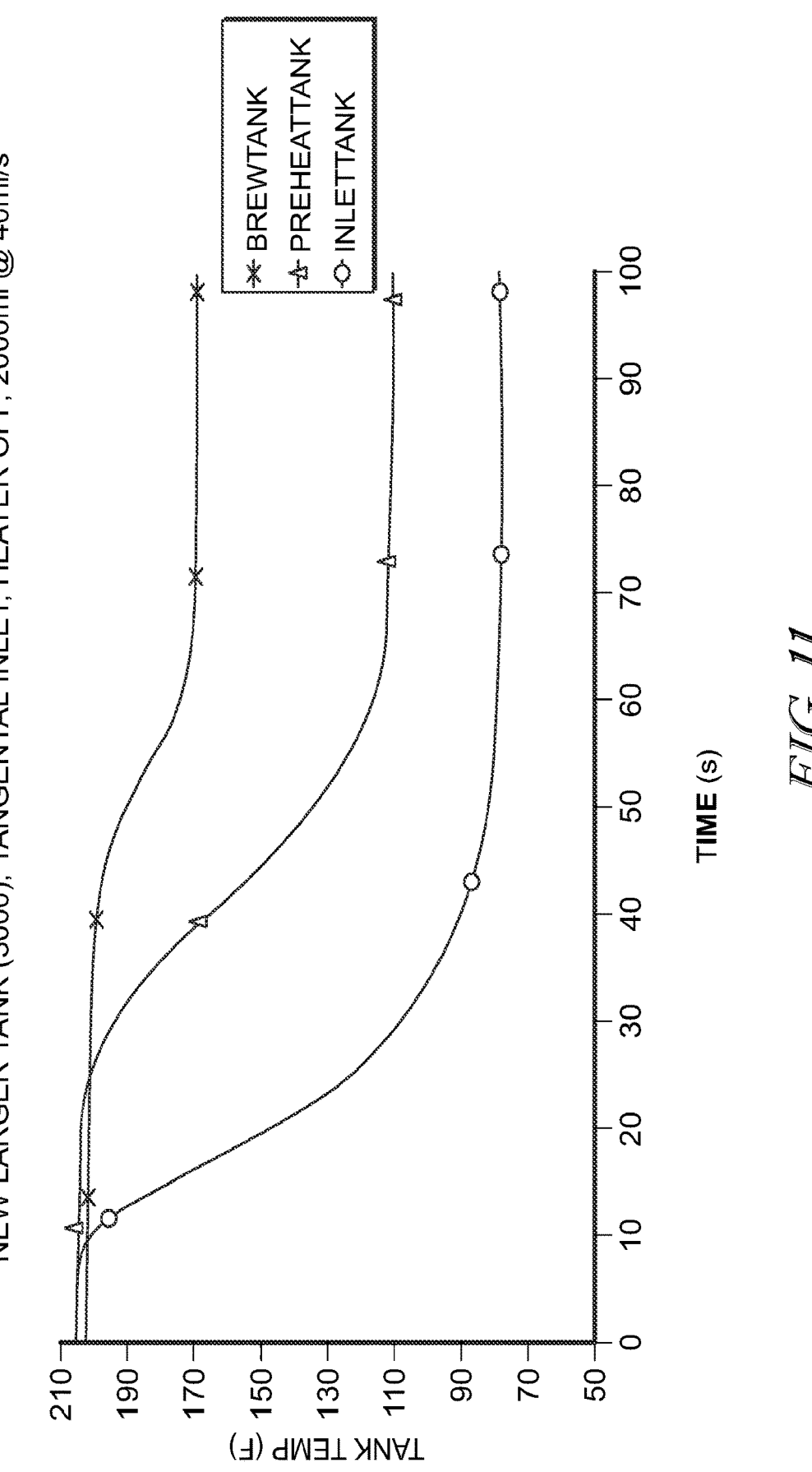
FIG. 11 and FIG. 12 show graphs associated with temperature associated with the tanks in the system showing the relative heating of each tank over various numbers of brew cycles and showing the progressive benefits of the multiple tanks connected in the daisy-chain configuration as set forth herein and illustrated herein.
Figure 12:
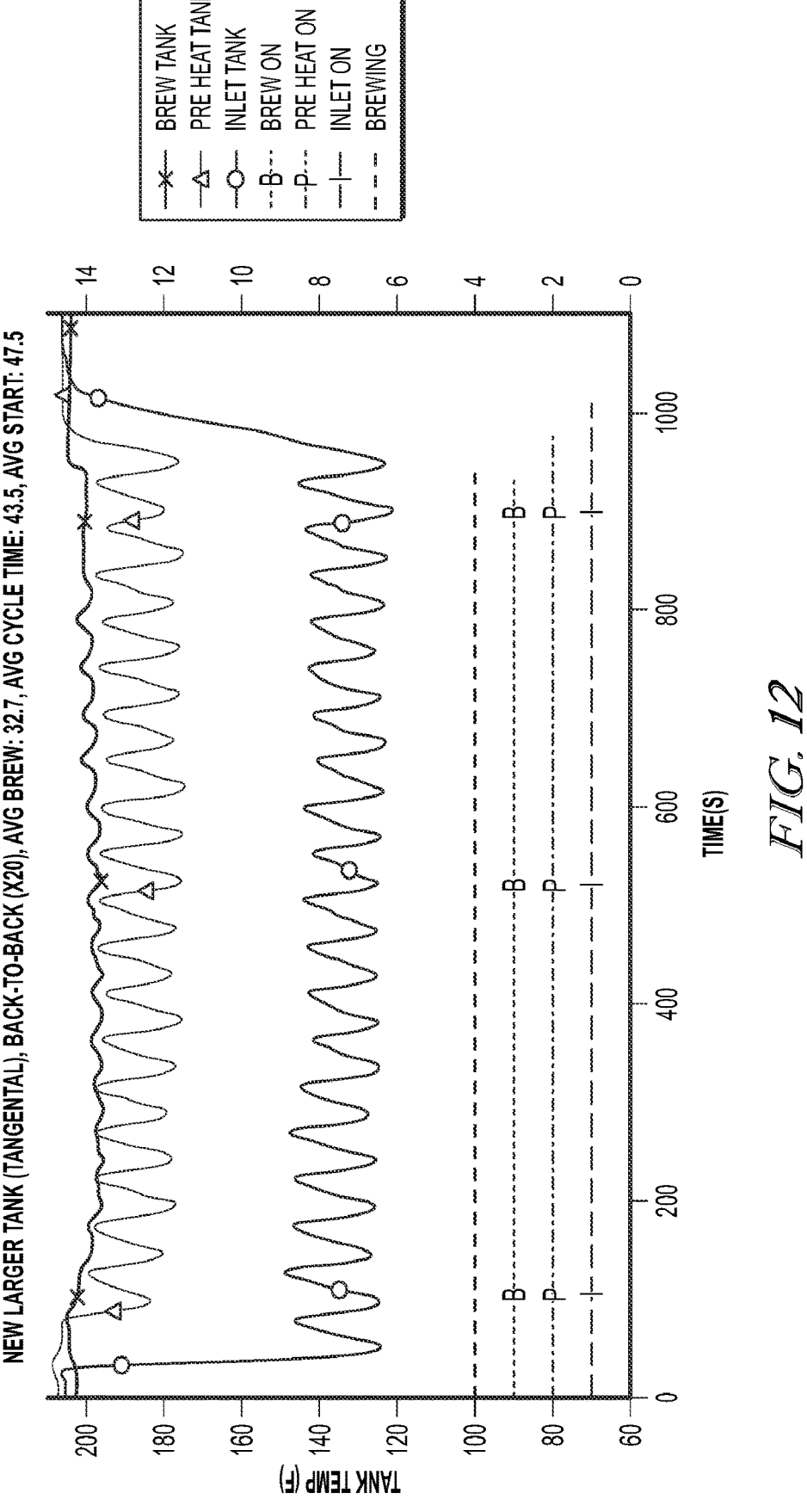

The use of multiple tanks allows for the tuning of the system of optimize the back-to-back dispensing and burst capacity. As shown in FIG. 7, the tangential inlet port 100a is located in the lower portion 74 of the tank 100. FIG. 8 shows this in a right side view of the tank 100. FIG. 9 is a cross sectional view of the tank taken along line 9-9 in FIG. 8 and revealing a coiled portion 120 of the heating element which has only been shown up this point by representation of the two electrical connection ends 102, 104. The coiled portion 120 is positioned in the lower portion 74 of the tank 100 to provide heat energy at the point of introduction of the water at the tangential port 100a. As water is fed into the tank under pressure of the pump 62, it is raised through the tank. The swirling of the tangential input creates stratification within the tank until it reaches the output port 100b at the upper portion 76 of the tank 100. As shown in the preceding Figures, the series of tanks progressively produces consistently maintained water temperature within the tank. In contrast, prior art systems in which water is introduced axially from the bottom upwardly through the tank, through a side without tangential introduction, or from the top using a down tube to introduce it to the bottom of the tank, the systems tend to create chaotic flow within the tank and significant mixing of water within the tank. These prior art systems rely on convection layering of water when the tanks are at rest to produce a desired water temperature. In contrast, the present tangential introduction of water into the tanks as shown herein provide a controlled introduction of water which helps increase the stratification of the tanks even during operating cycles.

Figure 13:
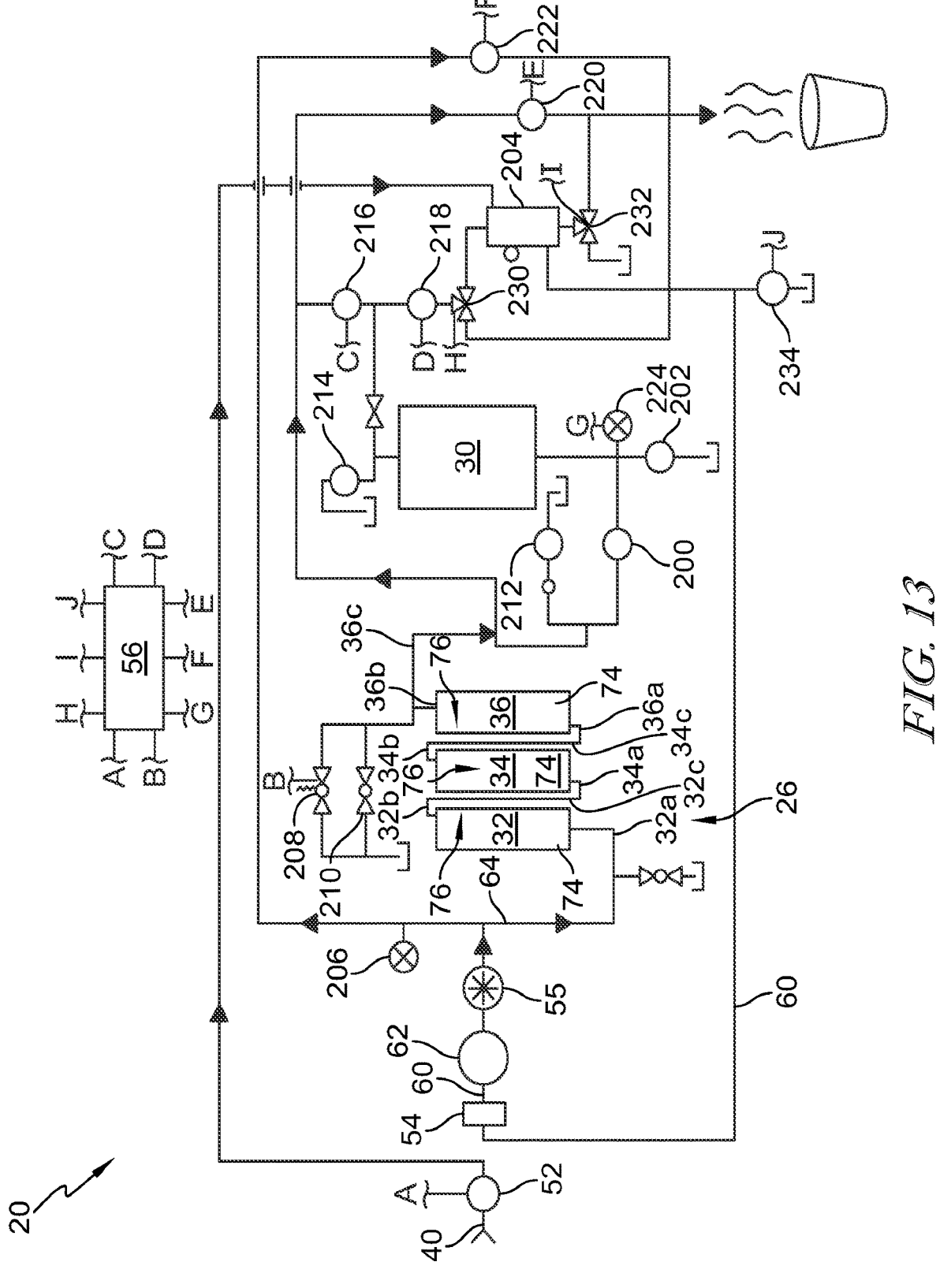
FIG. 13 is a schematic hydraulic flow diagram of the system set forth herein as employed with another beverage making apparatus in which the multiple heated water tanks are arranged in series to provide a "daisy-chain" configuration based on the teachings set forth herein.

As shown in FIG. 13, water is introduced through an inlet line 40 to provide water from a pressurized source to the apparatus 20. A controllable inlet valve 52 is coupled to the control system 56 via line A. Water in this configuration flows to a heat exchanger 204 and to the pressure regulator 54 via the line 60. The feed line 60 is connected to the pump 62 and a flow regulator 55 before it is introduced to the multiple tank heated water system 26. As noted herein above with regard to the description of the prior figures, the multiple tank heated water system 26 include a series of tanks 32, 34, 36. Each of the tanks has an upper portion 76 and a lower portion 74 with the inlet to each tank entering in the lower portion 74 and exiting the upper portion 76. Reference is made to FIGS. 5-10 with regard to a general configuration of each of these tanks and the tangential input to the each tank and the displacement output of each tank.

Each of the tanks is configured with a tangential inlet or port 100a to improve the motion of water within the cavity of the tank. In its basic form, water is introduced through the tangential port 100a in the lower portion 74 of each tank 32, 34, 36. Water entering tank 32 enters through input 32a connected in the lower portion of the tank 74. As water is heated within tank 32, it rises to the upper portion and is allowed to be displaced or flow out through output port 32b through outlet feedline 32c. Similarly, water introduced through the lower portion 74 of the tank 34 enters at inlet port 34a. As water is heated within the tank or displaced within the tank, it is allowed to flow out through outlet port 34b in the upper portion 76 of tank 34. Similarly, feedline 34c is introduced through the bottom portion 74 of tank 36 through inlet port 36a. As water is heated or displaced, it flows out through port 36b and the upper portion 76 of tank 36 and is passed through feedline 36c to the brew chamber 30.

A pressure transducer 206 is provided on a separate line that flows back to the heat exchanger 204. A pressure control valve 208 communicates with the control system 56 via line B. A manual tank ball valve vent 210 is provided in communication with the tanks 32, 34, 36. A water bypass valve 212 is provided downstream from the tanks to provide an alternate manual control path for dispensing water from the tanks. A brew water vent valve 214 is provided in communication with the brew chamber 30. A hot water bypass valve 216 is coupled to the control system 56 via line C. A brew chamber dispense valve 218 is provided and communicates with the control system 56 via line D. A brew chamber fill valve 220 communicates with the system and is connected to the control system 56 via line E. A brew chamber clean valve 222 communicates with the system and is controllably connected to the control system 56 by line F. A pressure transducer 224 is coupled to the system and provides signal to the control system 56 via line G. A three-way solenoid valve 230 communicates with the system and is coupled to the controller via line H. A chiller output valve which is a three-way solenoid valve 232 is coupled to the controller via line I. A chiller ambient drain valve 234 communicates with the system and is coupled to the controller via line J.

While the present disclosure describes various exemplary embodiments, the disclosure is not so limited. To the contrary, the disclosure is intended to cover various modifications, uses, adaptations, and equivalent arrangements based on the principles disclosed. Further, this application is intended to cover such departures from the present disclosure as come within at least the known or customary practice within the art to which it pertains. It is envisioned that those skilled in the art may devise various modifications and equivalent structures and functions without departing from the spirit and scope of the disclosure as recited in the following claims. The scope of the following claims is to be accorded the broadest interpretation so as to encompass all such modifications and equivalent structures and functions.

The invention claimed is:

1. A multiple tank heated water system for use with a beverage making apparatus comprising, at least two individual water tanks operatively connected and communicating for controllably heating respective volumes of water, a first tank of the at least two tanks including an input port receiving water from a water source for controllably heating a first volume of water within the first tank, the input port of the first tank being provided at a lower section of the first tank and oriented tangentially to a side of the first tank, an input port of a second tank of the at least two tanks communicating with an output port of the first tank to receive heated water from the first tank for controllably heating a second volume of water in the second tank, the output port of the first tank being provided at a top section of the first tank, and the input port of the second tank being provided at a lower section of the second tank and oriented tangentially to a side of the second tank, wherein the heated water system is configured to heat water controllably introduced to the first volume of water in the first tank, to controllably flow heated water from the first volume of water to the second volume of water for controllable heating in the second tank, and to controllably flow heated water from the second volume of water in the second tank through an output port of the second tank to the beverage making apparatus for use in producing a beverage, the output port of the second tank being provided at a top section of the second tank, a control system operatively associated with the heated water system for receiving information from the heated water system and controllably operating the heated water system in response to the information, a controllable inlet valve coupled to the input port on the first tank and communicating with the control system for controllably introducing water to the at least two tanks, wherein water controllably introduced into the heated water system displaces heated water from the at least two tanks for use in dispensing heated water in the production of the brewed beverage, at least two thermostats respectively connected to the at least two tanks for detecting respective temperatures of the respective volumes of water within the at least two tanks, each thermostat communicating with the control system, and at least two heating elements respectively associated with the at least two tanks which the control system activates and deactivates to introduce heat energy to the respective volumes of water to maintain the respective volumes of water within predetermined temperature ranges for the respective tanks, wherein the control system operatively controls water introduced to the first volume of water in the first tank for passage to the second volume of water in the second tank for dispensing from the second tank to provide heated water for use by the beverage making apparatus with temperatures of the respective volumes of water in the at least two tanks being controllably heated by the respective heating elements in response to temperatures detected by the thermostats associated with the respective tanks.

2. The heated water system of claim 1 in which each the first and second tanks includes a respective inlet line that is oriented in a configuration to tangentially introduce water into the lower section of the respective tank to help maintain a heated water striation within the respective tank.

3. The heated water system of claim 1 wherein the at least two tanks includes three tanks operatively coupled in series with water being introduced to the first tank, water flowing from the first tank to the second tank, water flowing from the second tank to the third tank, and water flowing from the third tank for use by the beverage making apparatus.

4. The heated water system of claim 3 wherein the at least two tanks includes four tanks operatively coupled in series with water flowing from the third tank to the fourth tank, and water flowing from the fourth tank for use by the beverage making apparatus.

5. The heated water system of claim 1 in which water is introduced to the first tank at the lower section of the first tank through the input port of the first tank to produce a tangential inlet flow to the first tank, the output port of the first tank being at the top section of the first tank to pass the heated water from the first tank toward the second tank before cooler water in the lower section, and the heated water exiting the first tank at the top section being introduced to the second tank at the lower section of the second tank through the input port of the second tank along a tangential flow pattern, the heated water exiting the second tank from the top section so as to provide the highest temperature water from the second tank for introduction to a subsequent third tank or to the beverage making apparatus.

6. A method of heating water using a multiple tank heated water system for use with a beverage making apparatus, the method comprising, providing at least two individual water tanks, operatively connecting the at least two tanks in series in fluid communication, using the at least two tanks to controllably heat respective volumes of water stored within the tanks for use by a beverage making apparatus, each water tank being provided with an input port at a lower section of the water tank and an outlet port at a top section of the water tank, the input port being oriented tangentially to a side of the respective water tank, the outlet port of a first tank of the at least two tanks communicating with the input port of a second tank of the at least two tanks, controllably introducing water to a first volume of water in the first tank from a water source for controllable heating, controllably introducing water to a second volume of water in the second tank from the first tank for controllable heating, controllably passing water from the second volume of water in the second tank to the beverage making apparatus, providing a control system operatively associated with the heated water system for receiving information from the heated water system and controllably operating the heated water system in response to the information, the control system controlling the heating and dispensing of water from the at least two tanks, providing respective thermostats connected to the at least two tanks for detecting the temperature of the respective volumes of water within the tanks, each thermostat communicating with the control system, and providing respective heating elements associated with the tanks, each heating element communicating with the control system which activates and deactivates the heating element to heat the volume of water within the respective tank to a predetermined temperature range of the respective tank, wherein water is introduced to the first tank at the lower section of the first tank through the input port of the first tank to produce a tangential inlet flow to the first tank, the output port of the first tank being at the top section of the first tank to pass the heated water from the first tank toward the second tank before cooler water in the lower section, and the heated water exiting the first tank at the top section being introduced to the second tank at the lower section of the second tank through the input port of the second tank along a tangential flow pattern, the heated water exiting the second tank from the top section so as to provide the highest temperature water from the second tank for introduction to a subsequent third tank or to the beverage making apparatus.

7. The method of claim 6 in which each of the at least two tanks includes a respective inlet line that is oriented in a configuration to tangentially introduce water into the lower section of the respective tank to help maintain a heated water striation within the respective tank.

8. The method of claim 6 wherein the at least two tanks includes three tanks operatively coupled in series with water being introduced to the first tank, water flowing from the first tank to the second tank, water flowing from the second tank to the third tank, and water flowing from the third tank for use by the beverage making apparatus.

9. The method of claim 8 wherein the at least two tanks includes four tanks operatively coupled in series with water flowing from the third tank to the fourth tank, and water flowing from the fourth tank for use by the beverage making apparatus.

10. A multiple tank heated water system for use with a beverage making apparatus comprising, a first water tank for controllably heating a first volume of water within the first tank, an input port of the first tank being provided at a lower section of the first tank and oriented tangentially to a side of the first tank and configured to receive water from a water source through the input port of the first tank to produce a tangential inlet flow of the water into the first volume of water, a second water tank for controllably heating a second volume of water within the second tank, an input port of the second tank being provided at a lower section of the second tank and oriented tangentially to a side of the first tank, the input port of the second tank being in communication with an output port of the first tank and configured to receive heated water from the first tank through the input port of the second tank to produce a tangential inlet flow of the heated water into the second volume of water, the output port of the first tank being provided at a top section of the first tank, a control system operatively associated with the heated water system for receiving information from the heated water system and controllably operating the heated water system in response to the information, first and second thermostats respectively connected to the first and second tanks for detecting respective temperatures of the respective first and second volumes of water within the first and second tanks, each thermostat communicating with the control system, first and second heating elements respectively associated with the first and second tanks which the control system activates and deactivates to introduce heat energy to the respective first and second volumes of water to maintain the respective first and second volumes of water within predetermined temperature ranges for the respective first and second tanks in response to temperatures detected by the thermostats, and a controllable inlet valve coupled to the input port on the first tank and communicating with the control system for controllably introducing water to the first tank to displace heated water from the tanks for use in dispensing heated water in the production of the brewed beverage, wherein the heated water system is configured to heat water controllably introduced to the first volume of water in the first tank, to controllably flow heated water from the first volume of water to the second volume of water for controllable heating in the second tank, and to controllably flow heated water from the second volume of water in the second tank through an output port of the second tank to the beverage making apparatus, the output port of the second tank being provided at a top section of the second tank.

11. The heated water system of claim 10 wherein the tangential inlet flows help maintain heated water striations within the respective first and second tanks.

12. The heated water system of claim 10 further comprising a third water tank for controllably heating a third volume of water within the third tank, a third thermostat connected to the third tank for detecting a temperatures of the third volume of water within the third tank, and a third heating element associated with the third tank which the control system activates and deactivates to introduce heat energy to the third volume of water to maintain the third volume of water within a predetermined temperature range for the third tank in response to a temperature detected by the third thermostat, the third tank operatively coupled in series with the first and second tanks, water flowing from the first tank to the second tank, water flowing from the second tank to the third tank, and water flowing from the third tank for use by the beverage making apparatus.

13. The heated water system of claim 12 further comprising a fourth water tank for controllably heating a fourth volume of water within the fourth tank, a fourth thermostat connected to the fourth tank for detecting a temperatures of the fourth volume of water within the fourth tank, and a fourth heating element associated with the fourth tank which the control system activates and deactivates to introduce heat energy to the fourth volume of water to maintain the fourth volume of water within a predetermined temperature range for the fourth tank in response to a temperature detected by the fourth thermostat, the fourth tank operatively coupled in series with the first, second, and third tanks, water flowing from the first tank to the second tank, water flowing from the second tank to the third tank, water flowing from the third tank to the fourth tank, and water flowing from the fourth tank for use by the beverage making apparatus.

14. The heated water system of claim 10 wherein the output port of the first tank is at the top section of the first tank to pass the heated water from the first tank toward the second tank before cooler water in the lower section, and wherein the heated water exits the second tank from the top section so as to provide the highest temperature water from the second tank for introduction to a subsequent third tank or to the beverage making apparatus.

\* \* \* \* \*

14